(12) United States Patent
Pappu et al.

(10) Patent No.: US 6,584,214 B1
(45) Date of Patent: Jun. 24, 2003

(54) IDENTIFICATION AND VERIFICATION USING COMPLEX, THREE-DIMENSIONAL STRUCTURAL FEATURES

(75) Inventors: Ravikanth Pappu, Cambridge, MA (US); Neil Gershenfeld, Somerville, MA (US); Joshua R. Smith, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/419,756

(22) Filed: Oct. 19, 1999

Related U.S. Application Data

(60) Provisional application No. 60/130,666, filed on Apr. 23, 1999.

(51) Int. Cl.[7] .................................................. G06K 9/00
(52) U.S. Cl. ........................ 382/108; 382/195; 382/206; 340/5.86
(58) Field of Search ................................. 235/380, 382; 340/5.1–5.86; 356/71; 382/195, 204, 206, 115, 108, 144, 145, 147, 149

(56) References Cited

U.S. PATENT DOCUMENTS

| | | | |
|---|---|---|---|
| 4,218,674 A | | 8/1980 | Brosow et al. |
| 4,423,415 A | | 12/1983 | Goldman |
| 4,568,936 A | | 2/1986 | Goldman |
| 4,661,983 A | * | 4/1987 | Knop ........................ 235/380 |
| 4,677,435 A | * | 6/1987 | Causse D'Agraives et al. ............................ 235/382 |
| 4,820,912 A | | 4/1989 | Samyn |
| 4,852,131 A | * | 7/1989 | Armistead ...................... 378/4 |
| 5,243,405 A | * | 9/1993 | Tichenor et al. ............ 356/600 |
| 5,325,167 A | * | 6/1994 | Melen ........................ 235/380 |
| 5,521,984 A | * | 5/1996 | Denenberg et al. ......... 382/100 |
| 5,578,813 A | | 11/1996 | Allen et al. |
| 5,686,720 A | | 11/1997 | Tullis |
| 6,219,439 B1 | * | 4/2001 | Burger ........................ 235/380 |
| 6,321,981 B1 | * | 11/2001 | Ray et al. .................... 235/380 |

OTHER PUBLICATIONS van Renesse, "3DAS: A 3Dimensional–Structure Authentication System," European Convention on Security and Detection, Conference Publication No. 408, May 16–18, 1995.
"El Gamal Signature Scheme Lecture Notes".
VeriSign, "About Digital IDs, Introduction to Cryptography".
ECOS, "Electronic and Digital Structures, Frequently Asked Questions".
Huang, et al., "Optical Coherence Tomography," Science 254, 1178–1181 (Nov. 22, 1991).
Minsky, "Memoir on Inventing the Confocal Scanning Microscope," Scanning vol. 10, pp. 128–138 (1988).
Hee, et al., "Femtosecond transillumination tomography in thick tissues," Optics Letters, vol. 18(13), pp. 1107–1109 (Jul. 1, 1993).
Schneier, et al., "Breaking Up Is Hard To Do: Modeling Security Threats for Smart Cards," Feb. 5, 1999.

* cited by examiner

*Primary Examiner*—Samir Ahmed
*Assistant Examiner*—Anand Bhatnagar
(74) *Attorney, Agent, or Firm*—Testa, Hurwitz & Thibeault, LLP

(57) ABSTRACT

Three-dimensional characteristics of a complex physical structure are used to generate a unique identifier. In effect, the characteristics reperesent the basis of a "physical one-way hash function" that faciliates ready derivation of an identifier based on the physical structure, the structure itself being very difficult to reproduce given only the identifier. The characteristics may be read using a non-contact probe and without the need for precise registration.

26 Claims, 2 Drawing Sheets

IDENTIFICATION AND VERIFICATION USING COMPLEX, THREE-DIMENSIONAL STRUCTURAL FEATURES

RELATED APPLICATION

This application stems from provisional application Ser. No. 60/130,666, filed on Apr. 23, 1999.

FIELD OF THE INVENTION

The present invention relates to authentication and validation of items such as currency, identification cards, and documents.

BACKGROUND OF THE INVENTION

Various forms of cryptography are commonly applied to electronic communications such as e-mail, cellular communications, and secure Internet transactions. In "public key" cryptography systems, each of the persons exchanging information receives a pair of keys: the public key and the private key. Each person's public key is published while the private key is kept secret. Messages are encrypted using the intended recipient's public key and can only be decrypted using his private key. As a result, the need for sender and receiver to share secret information—i.e., keys—via some secure channel is eliminated, since all communications involve only public keys. Private keys need not be transmitted or shared.

Public-key cryptography relies extensively on "one-way" functions and "trapdoor one-way" functions. A one-way function is significantly easier to compute in one direction (the forward direction) than in the opposite direction (the inverse direction). It might be possible, for example, to compute the forward function in polynomial time whereas an algorithm to compute the inverse function runs in exponential time. A trapdoor one-way function is a one-way function whose inverse direction is easy to compute given a certain piece of information (i.e., the trapdoor, which may be, for example, a prime factor) but difficult otherwise.

State-of-the-art authentication and digital-signature schemes also rely on "one-way hash" functions. A hash function takes a variable-size input, called a "pre-image," and reduces it to a fixed-size output called the "hash value." Hash functions are known by many names, among them compression functions, fingerprints, cryptographic checksums, and manipulation-detection codes. For one-way hash functions, it is easy to compute the hash value from the pre-image, but very difficult to compute the pre-image given the hash value.

The benefits of crytography stem from its high degree of reliability and low cost, since messages are readily encrypted and an encrypted message is as easily communicated as its unsecured counterpart. These benefits, however, presume that the message is realized as an electronic artifact or signal whose only value lies in the contents of what is encrypted. Information associated with physical objects, by contrast, is less amenable to protection by encryption since typically it is the object, and not the information, that has value. For example, even elaborate signatures intended to identify and authenticate documents or currency can be defeated by accurate copying.

An intermediate case is the so-called "smart card"—a credit card-sized device with an embedded chip used to identify the card and, depending on the application, containing additional information such as a monetary amount to which the cardholder is entitled. The digital information in a smart card is not amenable to easy duplication, as in the case of currency, yet because the information is contained within a physical medium, it may still be accessible to—and forged by—an unlawful possessor of the card. Talented thieves have successfully gained access to the value stored on cards by means of reverse engineering, fault analysis, and side-channel attacks such as power and timing analysis.

One proposed approach toward preventing forgery, applicable to ordinary items as well as to smart cards, is to utilize unique, hard-to-forge features intrinsic to the item itself. For example, U.S. Pat. Nos. 5,521,984, 4,677,435, and 5,325,167 rely on the fine features of an item's texture to generate a unique identifier associated with the item. The identifier is easy to generate but difficult to forge because it stems from physical attributes that are both highly numerous and random in nature.

Despite the appeal of this approach, the use of texture as contemplated in the prior art poses limitations. Surface texture is a two-dimensional artifice that can, with sufficiently accurate copying technology, be reproduced. Moreover, texture necessarily exposed to the environment and can change over time, particularly in the case of items (such as paper currency) that are routinely handled. While this does not necessarily facilitate forgery, it can impede validation, since the features used to compute the identifier may disappear or undergo change to an extent that destroys the physical key. Texture is also vulnerable to deliberate tampering, which can defeat identification altogether.

DESCRIPTION OF THE INVENTION

Brief Summary of the Invention

In accordance with the present invention, three-dimensional characteristics (rather than merely surface texture) of a complex physical structure are used in a mathematical function to identify the structure. In effect, the characteristics reperesent the basis of a "physical one-way hash function"—i.e., a fixed-size string of digits that is obtained by probing a complex three-dimensional structure. The characteristics are read using a non-contact probe, and preferably without the need for precise registration. The term "complex" is used herein to connote a structure that is easy to fabricate and to probe, but extremely difficult to accurately refabricate. The complexity may arise, for example, from inhomogeneity within the structure, from randomness or disorder, or from ordered but extremely complex structural featuers. The structure may be minuscule or large, depending on the application.

The features that form the basis of the identification may occur naturally in the item to be identified, or may instead be generated. Large physical structures with fine features are straightforwardly constructed yet difficult to duplicate accurately, owing to the random nature and density of the features. For example, voids or bubbles may be introduced into a polymeric matrix as it cures, resulting in a three-dimensional network of features. In this case, the features may be examined three-dimensionally using a tomographic technique, which reveals the pattern of voids on a slice-by-slice basis. More simply, coherent light may be directed through the structure and received optically; the resulting pattern ("speckle"), although viewed as a two-dimensional image, nonetheless contains substantial information about the three-dimensional pattern.

Other three-dimensional structures from which identifying information may be extracted include fused sand and multiphase materials (e.g., granular particles permanently suspended in a polymeric matrix, or alloys with different chemical and/or structural compositions), the distribution of the different phases providing the complexity. Complexity can also arise from differences in orientation and/or symmetry (e.g., in polycrystalline materials), from structural defects (e.g., in grown crystals), or from irregularities in interfaces between different materials (or phases of the same material). The authenticating three-dimensional structure may be inherent within an item, or may instead be physically introduced into or associated with an item to facilitate its authentication.

The level of detail used for identification need only be as fine as is necessary to reliably distinguish a particular structure from similar ones; or in the framework of the invention, the identifier derived from the structure need only be large enough (i.e., contain a sufficient number of bits) to be unique. By avoiding excessive structural characterization, the invention permits examinations to occur without precise registration. For example, a hash function may act on data derived from the physical structure to produce a hashed key. In principle, it is impossible to go backwards from a hashed key to the data derived from the physical structure. The hash function operates at a level of feature resolution appropriate to the desired degree of uniqueness. Generally, the identifier generated from the inhomogeneous structure can be used in either symmetric or asymmetric cryptography techniques.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
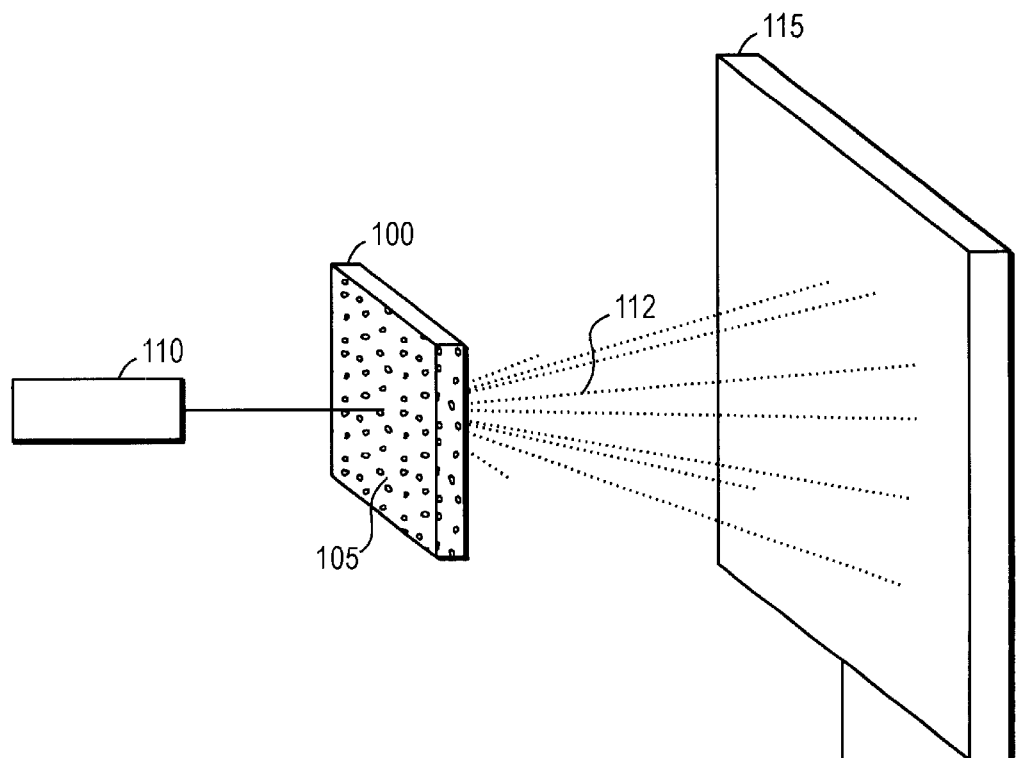
FIG. 1 schematically illustrates an authentication system embodying the invention and utilizing transmission through a translucent inhomogeneous structure.

With reference to FIG. 1, an authentication system utilizes a transparent or translucent structure 100 containing a pattern of permanently immobile features (representatively indicated at 105). The features may, for example, be voids (i.e., bubbles or cavities) or particles permanently fixed within in a polymeric matrix. For example, bubbles may be introduced into a polymer by aerating or turbulently mixing the polymer precursor prior to and/or during curing; obviously this approach is applicable to a wide range of curable polymers (epoxies, polyesters, polyethylenes, polycarbonates, etc.). Similarly, particles can be permanently suspended in a polymeric matrix by dispersing them as a colloidal suspension prior to curing. The primary characteristics of a suitable polymer for structure 100 are the ability to form and/or support a random dispersion of features 105 at a sufficient density; the ability to preserve this dispersion in the solidified state; and, if the structure is to be analyzed using light transmitted therethrough, sufficient translucency to an analyzing light beam.

In the illustrated configuration, the function of features 105 is to scatter coherent light, emitted by a laser source 110, as it passes through structure 100. The scattered light 112 emerging from structure 100 strikes a digitizer 115, which generates a digital image of the scattering pattern 112. Digitizer 115 may, for example, comprise a photodetector array of charge-coupled devices each representing one pixel of resolution, or may instead be an optical scanner arrangement. Depending on the degree of detail necessary to authenticate the structure 100, the resolution of the digitized image from digitizer 115 may be altered by a filter 120. Authentication is performed by an analysis module 125, which may be a computer programmed to execute the operations described below.

Ideally, the features 105 are randomly distributed both in terms of size and location. The scattering pattern 112 they produce reflects interference among the light paths followed by the incoming coherent light. So long as the sizes of features 105 are substantially larger than the wavelength of that light, the effect each feature exerts on the scattering pattern 112 extends beyond its own spatial dimension; that is, the path-altering effect of each feature 105 on an incoming light ray cascades in significance as the directly affected rays interact with other rays propagating through structure 100. As a result, the change in the scattering pattern 112 produced by removal of a single feature would not be limited to the location and size of the feature, and this effect strongly promotes both the certainty of identification and the difficulty of counterfeiting a given structure 100. It may also permit scattering pattern 112 to be analyzed at a resolution coarser than the density of the features 105.

The appearance of scattering pattern 112 depends on the volume density and sizes of features 105 and the refractive index of the structure 100. These constraints impose an inherent resolution ceiling on the pattern (independent on the means used to detect it) and, therefore, the number of reliable identifiers that may be derived from the pattern. For the reasons that follow, the maximum number of identifiers may also be limited by the manner in which an identifier is derived from the digitized pattern.

Most simply, the scattering pattern 112 is simply compared against a an expected pattern stored in analysis module 125, and a correlation score developed to assess the degree of similarity. Correlation is an analytical technique for comparing two data sets that is useful for finding similar regions in two images. The normalized correlation $\phi_{ab}(x,y)$ of two images described by the arrays $a(x,y)$ and $b(x,y)$, a and b representing some definitive encoded parameter such as luminance, is defined by $$\phi_{ab}(x,y) = \frac{\int_{-\infty}^{\infty}\int(a(\xi-\eta)-\overline{a})(b(\xi-x,\eta-y)-\overline{b})d\xi d\eta}{\{\int_{-\infty}^{\infty}\int(a(\xi-\eta)-\overline{a})^2 d\xi d\eta \int_{-\infty}^{\infty}\int(b(\xi-x,\eta-y)-\overline{b})^2 d\xi d\eta\}}$$

where $\overline{a}$ is the mean value of $a(x,y)$ and $\overline{b}$ is the mean value of $b(x,y)$.

For a given pair of coordinate values $(x_0,y_0)$, the integral $\phi_{ab}(x_0,y_0)$ includes the product of the parameter values at each point of one image with the value at the point in the other image and so provides a point-wise comparison of the patterns $a(x,y)$ and $b(x,y)$ in a coordinate system that is invariant to the shift $(x_0,y_0)$ between the origins of the images. Thus, the value of the correlation function $\phi_{ab}(x_0,y_0)$ expresses the similarity between patterns $a(x,y)$ and $b(x,y)$ when $a(x,y)$ is shifted by $(x_0,y_0)$ with respect to $b(x,y)$. For example, when the value of the correlation function $\phi_{ab}(x_0,y_0)$ is large and positive, then the pattern $b(x,y)$ resembles $a(x-x_0,y-y_0)$. A smaller positive value of $\phi_{ab}(x_0,y_0)$ would indicate a weaker resemblance. Negative values of $\phi_{ab}(x_0,y_0)$ would indicate that the patterns have an opposite behavior with respect to the parameter being correlated.

The correlation score may be thresholded to return a match/no match condition, so that any correlation score above the threshold is assumed to indicate a match. The threshold is selected based on a desired degree of certainty and to accommodate expected variation due to noise. Another approach is to quantize the candidate scattering pattern to one of many stored scattering patterns before performing the correlation. In this case, the output of the correlation will readily indicate a match or no-match condition.

Alternatively, analysis module 125 can derive from a scattering pattern a mathematical indicium other than a correlation score for purposes of comparison to other, similarly represented patterns. Thus, the indicium can be utilized as a cryptographic key. As noted above, a hash function may act on data—such as the digitized pattern 112—derived from the structure 100 to produce a hashed key representative of and characterizing that particular structure.

In still another alternative, a known identifier is encoded on a reflective structure that is embedded within a void-containing polymeric structure 100. The detector and light source are located on the same side of the structure. Coherent light passes through the matrix, reflects off the known identifier, and passes again through the matrix before impinging on the photodetector. In this way, a deterministic identifier modulates a random pattern to produce a unique hashed key. The identifier is tamper-proof because changing any features of the matrix on the order of the wavelength changes the speckle pattern and, therefore, the encoded information.

Hash functions and techniques for their construction are well-known in the art. The particular hash function to which the digitized representation of pattern 112 is subjected is not critical, so long as it is derived from all of the image data and avoids collisions when applied to numerous patterns generated from similarly constructed physical structures. Because of the random nature of the features 105, even constructions 100 that are prepared under highly similar conditions will nonetheless contain a great deal of three-dimensional uniqueness; accordingly, given sufficient image resolution of the pattern and a robust hash function, unique hash keys are easily obtained for many structures 100.

Ideally, collision-resistant one-way hash functions are used to derive the hashed key. Several suitable hash functions are well-characterized in the art. These include Message Digest 5 (MD5), which produces a 128-bit hashed key, and the Secure Hash Algorithm (SHA), which produces a 160-bit hashed key. SHA is a much-used hash function; see, e.g., Federal Information and Processing Standard 180-1 (April 1999, Nat. Inst. Standards and Tech.)

The scale of the components shown in FIG. 1 can be quite small. For example, structure 100 may occupy a small portion of a credit card, which is inserted into a reader containing the other components and not much larger in size than the credit card. Again, the scale of structure 100 is largely based on the desired size—i.e., bit length—of the identifier.

Figure 2:
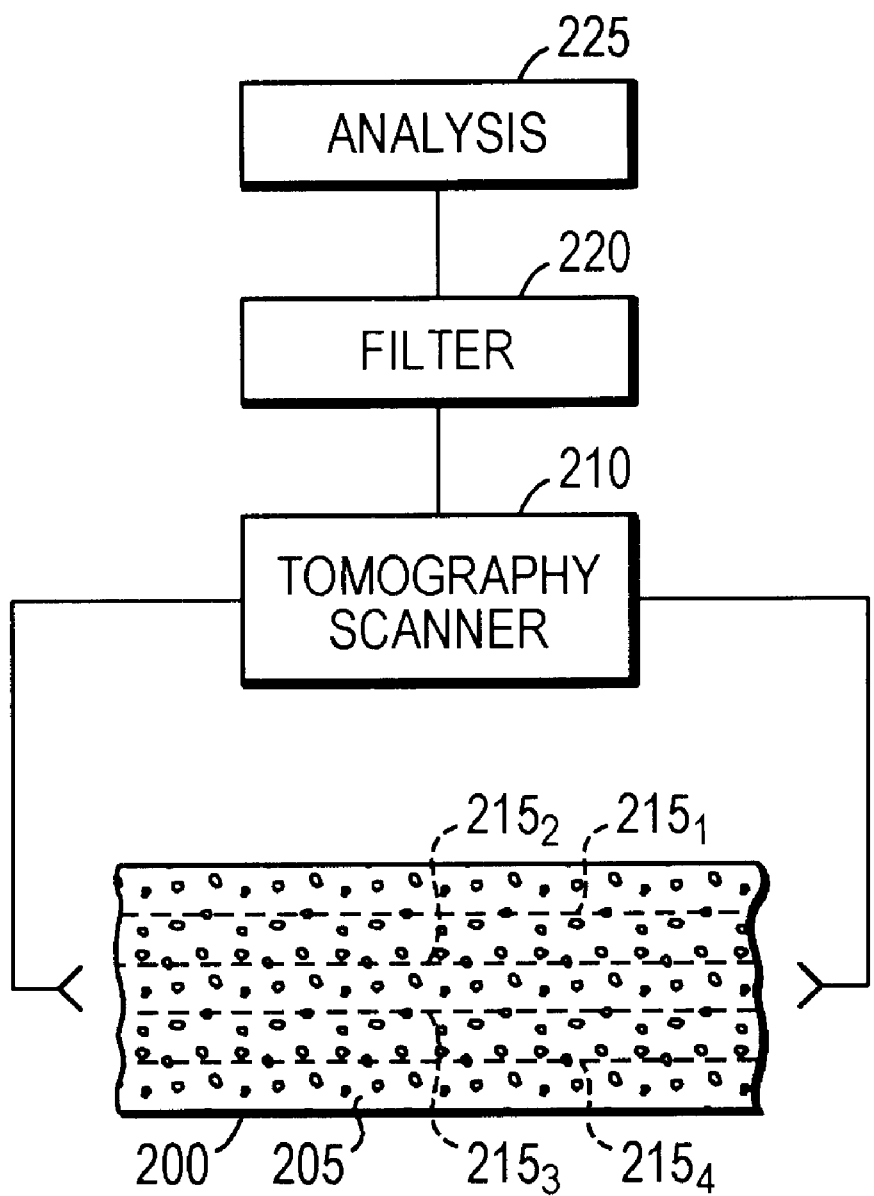
FIG. 2 schematically illustrates an authentication system embodying the invention and utilizing tomography to characterize the three-dimensional features of an inhomogeneous structure.

The implementation shown in FIG. 1 utilizes a two-dimensional analysis to probe and represent the three-dimensionally distributed features 105 of structure 100. It is equally possible to utilize tomography techniques to characterize the features three-dimensionally. With reference to FIG. 2, a tomographic scanner 210 develops a series of planar, cross-sectional image slices of a structure 200 (which is shown in end view) that contains an inhomogeneous distribution of features 205. The imaged slices, four of which are representatively indicated at $215_1$, $215_2$, $215_3$, $215_4$, collectively represent the three-dimensional structure 200.

Each image slice 215 is digitized by scanner 210 and processed as necessary by filter 220 before being stored in analysis module 225—either directly, as an image file, or as a mathematical indicium representative thereof (or representative of the entire set of slices). A tomographic approach more explicitly represents the three-dimensional characteristics (unmediated by scattering effects) of structure 200, and is necessarily employed where the material of structure 200 is not optically transparent or does not lend itself to generation of an adequate scattering pattern.

The particular tomography modality likewise depends on the material of structure 200. Optically transmissive materials can be analyzed, for example, using confocal scanning (see, e.g., Minsky, *Scanning* 10:128 (1988)) or optical coherence tomography (see, e.g., Huang et al., *Science* 254:1178 (1991)). For optically non-transmissive materials, x-ray computed tomography (see, e.g., Houndsfield, *Br. J. Radiol.* 46:1016 (1973)), magnetic resonance imaging (see, e.g., Damadian et al., *Physiol. Chem. Phys.* 9:97 (1977)), or ultrasound imaging (see, e.g., Wild et al., *Science* 115:226 (1952)) may be employed.

It will therefore be seen that the foregoing represents a highly reliable, conveniently implemented approach to authentication and validation of a wide range of articles. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of authenticating an item having a complex three-dimensional internal structure, the method comprising the steps of:
    a. initially reading at least a portion of the item through three dimensions to identify a unique characteristic pattern in the internal structure of the item;
    b. deriving a validating indicium from the pattern in accordance with a mathematical function;
    c. subsequently reading a candidate item having a complex three-dimensional internal structure, identifying a candidate pattern in the internal structure of the candidate item, and deriving therefrom a candidate indicium in accordance with the mathematical function; and
    d. determining a correlation between the candidate indicium and the validating indicium.

2. The method of claim 1 wherein the structure is inhomogeneous.

3. The method of claim 1 wherein the three-dimensional structure comprises intrinsic features, the pattern corresponding to the features represented at a predetermined level of detail.

4. The method of claim 3 wherein the indicium has a size, the level of detail being determined by the size of the indicium derived from the pattern.

5. The method of claim 3 wherein the features are voids within a solid matrix.

6. The method of claim 5 wherein information embedded within the matrix is used to modulate the candidate pattern.

7. The method of claim 6 wherein the information is on a reflective structure embedded within the matrix, coherent light passing into the matrix, striking the reflective structure, and returning out of the matrix in modulated form for detection.

8. The method of claim 3 wherein the features are particles suspended within a solid matrix.

9. The method of claim 3 wherein the structure comprises a multiphase material, the features being formed by different phases.

10. The method of claim 3 wherein the structure comprises a pattern of defects giving rise to the features.

11. The method of claim 3 wherein the structure comprises an interface having complex irregularities giving rise to the features.

12. The method of claim 3 wherein the structure comprises a complex arrangement of at least one of orientations and symmetries giving rise to the features.

13. The method of claim 3 wherein the reading step comprises passing coherent radiation through the structure, the features scattering the radiation to produce a scattering pattern.

14. The method of claim 3 wherein the reading step comprises tomographically obtaining a set of planar, cross-sectional image slices through the structure and including features therein.

15. The method of claim 1 wherein the correlation is a score representing a probability of a match between the candidate indicium and the validating indicium.

16. The method of claim 15 wherein the score is thresholded to return a match/no match condition.

17. The method of claim 1 wherein the indicium is a hashed key and the deriving steps comprise application of a hash function to the pattern.

18. The method of claim 1 wherein the indicium is encrypted, the step of deriving a validating indicium comprises the step of applying a cryptographic key to the characteristic pattern, and the step of deriving a candidate indicium comprises the step of applying a corresponding key to the candidate pattern.

19. A reader for authenticating an item having a complex three-dimensional internal structure, the apparatus comprising:
  a. means for receiving a validating indicium previously derived from the item in accordance with a mathematical function operative on three-dimensional internal structural characteristics thereof;
  b. means for reading a candidate item to derive, from three-dimensional internal structural characteristics of the candidate item, a candidate indicium in accordance with the mathematical function; and
  c. an analyzer for determining a correlation between the candidate indicium and the validating indicium.

20. The apparatus of claim 19 wherein the three-dimensional structure comprises intrinsic features, the reader operating to discern a pattern corresponding to the features at a predetermined level of detail.

21. The apparatus of claim 20 wherein the reading means comprises:
  a. a source of coherent radiation through the structure, the features scattering the radiation to produce a scattering pattern; and
  b. means for digitizing the scattering pattern.

22. The apparatus of claim 20 wherein the reading means comprises a tomography unit configured to obtain a set of planar, cross-sectional image slices through the structure and including features therein.

23. The apparatus of claim 19 wherein the correlation is a score representing a probability of a match between the candidate indicium and the validating indicium.

24. The apparatus of claim 19 wherein the the analyzer is configured to threshold the score to return a match/no match condition.

25. The apparatus of claim 19 wherein the indicium is a hashed key and the analyzer is configured to apply a hash function to the pattern.

26. The apparatus of claim 19 wherein the indicium is encrypted, the validating indicium being derived by application of a secret key to the characteristic pattern, the analyzer being configured to apply a public key to the candidate pattern.

* * * * *